United States Patent [19]

Kiefer

[11] Patent Number: 5,481,951
[45] Date of Patent: Jan. 9, 1996

[54] SELF-CENTERING SUPPORT

[75] Inventor: Jürgen Kiefer, Friedrichshafen, Germany

[73] Assignee: SMW Schneider & Weisshaupt GmbH, Meckenbeuren, Germany

[21] Appl. No.: 153,566

[22] Filed: Nov. 16, 1993

[30] Foreign Application Priority Data

Nov. 16, 1992 [DE] Germany .......................... 42 38 613.6

[51] Int. Cl.⁶ .............................. B23B 13/12; B23B 31/00
[52] U.S. Cl. .............................................................. 82/162
[58] Field of Search .............................. 82/162, 164, 170, 82/903; 269/104, 107, 108, 217; 451/407, 408

[56] References Cited

U.S. PATENT DOCUMENTS

| 4,463,635 | 8/1984 | Hafla et al. ................................. 82/162 |
| 4,519,279 | 5/1980 | Ruggeri ....................................... 82/162 |
| 4,754,673 | 7/1988 | Hiestand ...................................... 82/162 |

FOREIGN PATENT DOCUMENTS 3543806  12/1985  Germany .

Primary Examiner—Mark Rosenbaum
Assistant Examiner—Kenneth J. Hansen
Attorney, Agent, or Firm—Robert W. Becker & Associates

[57] ABSTRACT

A self-centering support for clamping and/or securing a workpiece on a turning lathe has a housing and three securing members connected in the housing and adjustable in a common plane for securing the workpiece. A first and a second one of the securing members are positioned laterally within the housing and are arranged mirror-symmetrically to one another. Each first and second securing members comprises a pivot bolt for pivotably connected them to the housing. A third securing member is positioned between the first and second securing members and is slidably guided within the housing so as to be radially displaceable relative to the workpiece. The third securing member has a center piece with control surfaces. The first and second securing members each have an end for operating with the control surfaces of the center piece. A first rocker arm couples the first and third securing members for displacement of the first securing member such that upon actuation of the rocker arm an insertion opening for the workpiece is enlarged. The first rocker is an angular lever with a first and a second leg and pivotably supported at the housing and/or at the first securing member. The rocker arm is pivotable by displacement of the third securing member according to a control curve.

16 Claims, 9 Drawing Sheets

5,481,951

SELF-CENTERING SUPPORT

BACKGROUND OF THE INVENTION

The present invention relates to a self-centering support for clamping and/or supporting a workpiece on a turning lathe with three securing members connected in the housing and adjustable in a common plane for securing the workpiece, wherein the two laterally positioned securing members are mirror-symmetrically arranged relative to one another and are pivotably supported on pivot bolts at the housing. They are embodied as angular levers and the centrally positioned securing member is radially slidably guided toward the workpiece within the housing and actuatable by an actuating piston loaded by a pressure medium. The centrally positioned securing member has a center piece that is provided with control surfaces and that cooperates with free ends of the angular levers, preferably via rollers. For increasing the insertion opening of the support, one or two of the laterally positioned securing members are coupled with a rocker arm to the center piece or the centrally positioned securing member for a forcible displacement.

From German Patent 35 43 806 a support of the aforementioned kind is known which has been successfully used in practice. In this known design, one of the two laterally positioned securing members is pivotable for enlarging the insertion opening due to an additional displacement movement of the centrally positioned securing member and the rocker arm which is directly connected to the center piece. However, due to the connection of the rocker arm at the center piece the pivoting range is limited. The rocker arm in this design is connected between the pivot bolt supporting the securing member and the roller connected to the securing member and cooperating with the control surface of the center piece. Furthermore, it is disadvantageous that a spring is supported at the rocker arm which, for compensation of different displacement strokes of the securing member, is provided with a slotted hole that is engaged by a bolt connected to the securing member. When the spring breaks, respectively, when the prestress decreases, a guiding of the outer securing member is no longer provided.

It is therefore an object of the present invention to provide a self-centering support of the aforementioned kind with which at least one of the two laterally positioned securing members can be outwardly pivoted by an additional displacement movement of the centrally positioned securing member and with which a secure coupling of the additionally pivotable securing member is ensured. The laterally positioned securing member should be pivotable about 90° and more relative to the clamping position so that even for a vertical arrangement of the support the workpieces to be machined can be horizontally inserted. The required constructive expenditure should be minimal; however, it should be ensured that even for high loads damages are prevented and a high operational safety is attainable. It should furthermore be possible that a securing member which is not additionally adjustable can be supported in any suitable angular position.

BRIEF DESCRIPTION OF THE DRAWINGS

This object, and other objects and advantages of the present invention, will appear more clearly from the following specification in conjunction with the accompanying drawings, in which.

SUMMARY OF THE INVENTION

Figure 1:
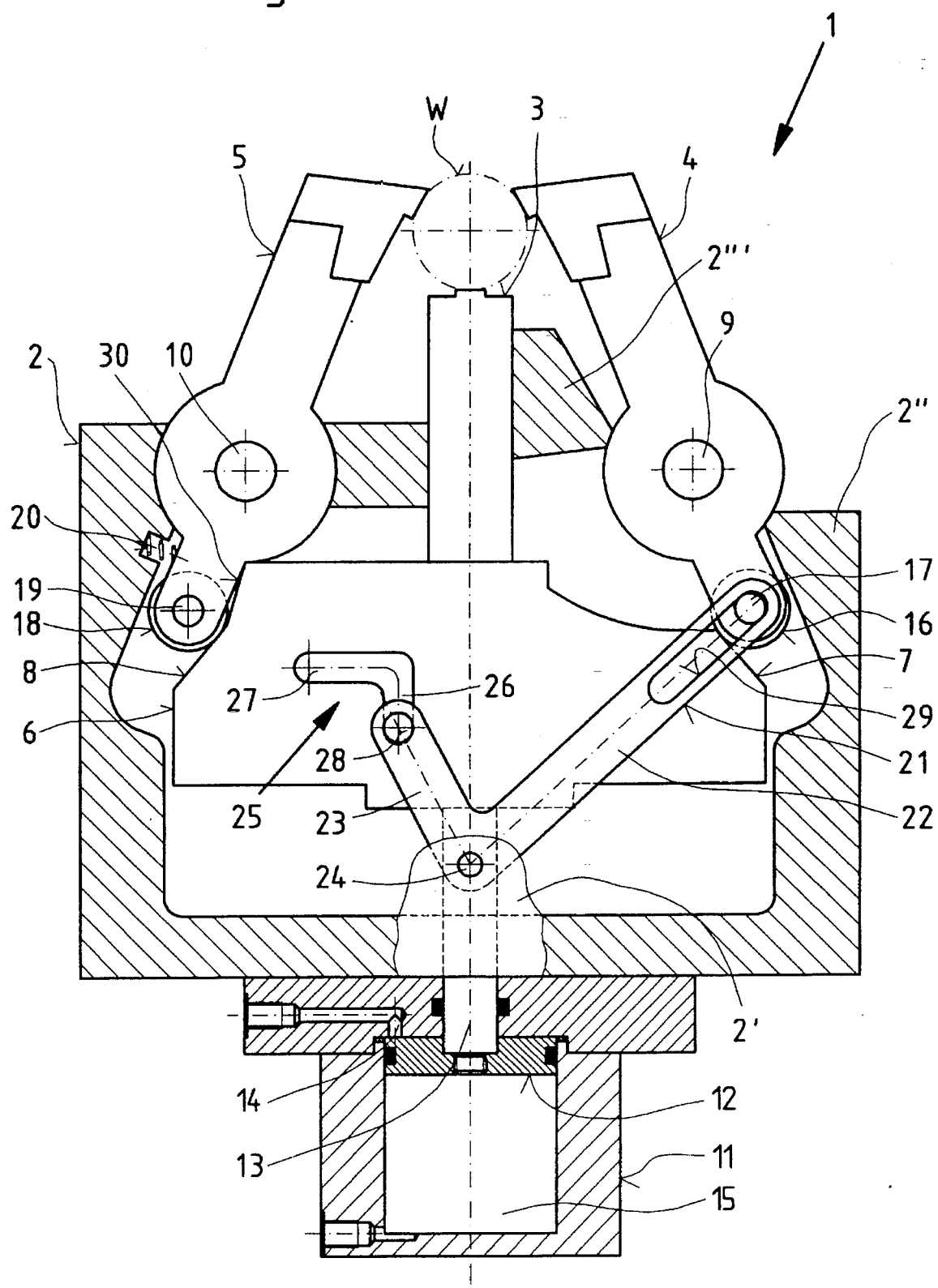
FIG. 1 shows a support in an end view with an additionally pivotable, laterally positioned securing member, shown in the clamping position.

The self-centering support for clamping and/or securing a workpiece on a turning lathe according to the present invention is primarily characterized by:

A housing;

Three securing members connected in the housing and adjustable in a common plane for securing a workpiece, the three securing members each having a first end for securing the workpiece;

A first and a second one of the securing members positioned laterally in the housing and arranged mirror-symmetrically to one another;

The first and second securing members each comprising a pivot bolt for pivotably connecting the first and the second securing members to the housing;

A third one of the securing members positioned between the first and the second securing members and slidably guided within the housing so as to be radially displaceable relative to a workpiece;

The third securing member comprising a center piece connected thereto, the center piece having control surfaces;

The first and second securing members each having a second end opposite the first end for cooperating with the control surfaces of the center piece;

A first rocker arm for coupling the first securing member to the third securing member for displacement of the first securing member such that upon actuation of the first rocker arm an insertion opening for the workpiece between the three securing members is enlarged;

The first rocker arm being in the form of an angular lever with a first and a second leg, the first rocker arm being pivotably supported at the housing and/or at the first securing member; and The first rocker arm pivotable by a displacement of the third securing member according to a control curve.

Preferably, the first and second securing members each have a roller connected to the second end for cooperating with the control surfaces.

Expediently, of the control surface cooperating with the second end of the second securing member has an abutment surface formed as an extension of the control surface for guiding the second securing member with the roller.

Advantageously, the first leg of the first rocker arm has a free end with a slotted hole. The first securing member in this embodiment has a bearing bolt for supporting the roller at the second end. The bearing bolt engages the slotted hole for connecting the first leg of the first rocker arm to the first securing member.

In a preferred embodiment of the present invention, the first rocker arm has a pivot bolt positioned at a junction of the first and the second legs, the pivot bolt connected to the housing. Preferably, the housing comprises a cover and the pivot bolt of the first rocker arm is connected to the cover.

Expediently, the pivot bolt of the first rocker arm is connected centrally relative to the third securing member.

In another preferred embodiment of the present invention, the control curve is located at the third securing member and one of the first and the second legs of the first rocker arm coordinated with the control curve has a guide element for engaging the control curve. Preferably, the guide element is a pin.

Expediently, the control curve is comprised of a first portion extending parallel to a direction of displacement of the third securing member and a second portion extending perpendicularly to the direction of displacement of the third securing member. Advantageously, the control curve is located at the center piece.

In another embodiment of the present invention, the first rocker, at a junction of the first and the second legs, has a pivoting connection to the first securing member. Preferably, the first leg of the first rocker arm has a pivot bolt connected to the housing, the first leg pivotably supported at the pivot bolt. The control curve in this embodiment is located at the second leg of the first rocker arm. The third securing member has a guide element for engaging the control curve.

Preferably, the housing comprises a cover and the pivot bolt of the first leg is connected to the cover. Expediently, the guide element is in the form of a pin.

The guide element is preferably connected to the center piece of the third securing element.

Advantageously, the control curve is comprised of a first portion extending parallel to a direction of displacement of the third securing member and a second portion extending from the first portion toward the pivoting connection of the first rocker arm.

In a preferred embodiment of the present invention, the pivot bolt of the first leg of the first rocker arm is connected laterally adjacent to the third securing member.

Advantageously, the first leg of the first rocker arm has a slotted hole extending in a longitudinal direction of the first leg and positioned proximal to the first securing member. The first securing member has a projecting bolt engaging the slotted hole that displaceably guided within the slotted hole within a clamping range of the support.

Expediently, the first leg of the first rocker arm is connected at a first connecting point to the first securing member. The second leg of the first rocker arm is pivotably connected at a second connecting point to the housing. The first and the second connecting points are substantially at a same level of the housing. The second leg is preferably coordinated with the third securing member and coupled to the control curve.

The first connecting point is advantageously centrally positioned between the pivot bolt of the first securing member and a sidewall of the housing proximal to the first securing member.

Advantageously, the control curve is located at the third securing member and extends in the form of a guide groove in an axial direction of the third securing member. The first rocker arm has a projecting guide element engaging the control curve.

Preferably, the control curve is located at the center piece of the third securing member. Preferably, the guide element is a guide pin.

In another preferred embodiment of the present invention, the third securing member has a receiving recess on a first side thereof for receiving the second end of the first securing member upon actuation by the first rocker arm.

Preferably, the support further comprises a second rocker arm, identical to the first rocker arm and connected to the second securing member, wherein the third securing member has a second receiving recess arranged on a second side opposite the first side for receiving the second end of the second securing member upon actuation by the second rocker arm.

In a preferred embodiment of the present invention, the support further comprises a second rocker arm for connecting the second securing member to the third securing member, the second rocker arm having a first and a second leg and being pivotably connected to the third securing member with a Junction of the first and the second legs. The first leg is pivotably connected to the second securing member and the third securing member has a second control curve with which control curve the second leg is displacable.

Preferably, the second control curve is located at the center piece. Advantageously, the second rocker arm is connected to the center piece.

According to the present invention, it is thus suggested that the rocker arm is provided in the form of a two-legged lever which is pivotable at the housing of the support and/or at the laterally positioned securing member that is to be displaced. The laterally positioned securing member to be displaced is pivoted with a control curve due to an additional displacement movement of the centrally positioned securing member.

According to a preferred embodiment of the present invention, each rocker arm may be pivotably supported on a pivot bolt with a junction of the two legs of the rocker arm, preferably centrally relative to the centrally positioned securing member, whereby the pivot bolt is inserted into the housing of the support and/or into a cover of the housing. The control curve may be provided at the center piece or the centrally positioned securing member whereby a guiding element engages the control curve, the guiding element being connected to the end of the corresponding leg of the rocker arm and being preferably in the form of a pin.

It is furthermore expedient that the control curve is comprised of a first portion extending perpendicularly to the direction of displacement of the centrally positioned securing member and a second portion extending in the direction of displacement of the centrally positioned securing member. The leg of the rocker arm which is coordinated with laterally positioned securing member is preferably connected to the bolt which supports the roller that cooperates with the control surface of the center piece. The bolt engages a slotted hole provided in the end zone of the leg and extending in the leg's longitudinal direction.

In another embodiment the rocker arm may be pivotably connected at the junction of the two legs with the laterally positioned securing member, whereby one of the legs of the rocker arm is pivotably connected on a pivot bolt which is supported at the housing of the support and/or the cover of the housing, and whereby the other leg of the rocker arm is provided with a control curve into which a guiding element, preferably in the form of a pin, connected to the center piece or the centrally positioned securing member projects.

In this embodiment the control curve, within the clamping range of the support, should be comprised of a first curved portion extending in the direction of displacement of the centrally arranged securing member and a second curve portion extending from the inwardly positioned end of the first portion into the direction of the pivoting connection of the rocker arm at the laterally positioned securing member. One leg of the rocker arm should be pivotably connected at a point laterally adjacent to the centrally positioned securing member at the housing or the housing cover with a pivot bolt.

It is furthermore suggested for the compensation of different displacement strokes of the securing members to provide the pivotably connected leg of the rocker arm in the area of the laterally positioned securing member with a slotted hole extending in the longitudinal direction of the leg in which slotted hole a bolt projecting from the laterally positioned securing member is displaceably guided within the clamping range of the support.

According to another embodiment of the inventive support, the rocker arm may also be connected with its end portions of its two legs, on the one hand, to the laterally positioned securing member within the clamping range of the support, preferably at the center between the pivot bolt and the side wall of the housing enclosing the laterally positioned securing member, and on the other hand, connected in a pivotable manner approximately at the same level of the housing, whereby the leg coordinated with the centrally positioned securing member should be coupled to the control curve.

The control curve in this embodiment is provided within the centrally positioned securing member or the center piece of the centrally positioned securing member, and is preferably provided as a guide groove extending in the axial direction of the securing member. The guide groove is engaged by a guiding element in the form of a pin projecting from the rocker arm.

In order to reduce the width of the support the centrally positioned securing member should be provided on one or both sides with a receiving recess into which the ends of the laterally positioned securing members contacting the control surfaces should be introducible by the rocker arm in a forced manner.

For guiding one of the securing members which is arranged opposite to the securing member which is displaceable for enlarging the insertion opening, the center piece may be provided with an abutment surface formed as an extension of the corresponding control surface for the roller cooperating with this control surface. However, it is also possible that such a securing member is connected with a further two-legged angular lever in the form of a rocker arm with the center piece or with the centrally positioned securing member in a driving connection, whereby the rocker arm is pivotably connected at the junction of the two legs. One leg of the rocker arm is pivotably connected to the securing member and the other leg is displaceable with the control curve provided at the center piece or the centrally positioned securing member.

When a self-centering support is embodied according to the present invention, it is not only possible that one or both of the laterally positioned securing members are outwardly pivoted by an additional displacement movement of the centrally positioned securing member so that the workpiece may also be inserted perpendicular to the displacement direction of the centrally positioned securing member into the support, but, it is also ensured that an outwardly pivoted securing member can be returned without difficulties in a forced manner into its initial position. Due to the embodiment of the rocker arm as a lever with two legs which may be pivotably supported at different components of the support and is pivoted due to the additional relatively short displacement movement of the centrally positioned securing member, it is furthermore ensured that the laterally positioned securing member can be pivoted outwardly about an angle of up to 110° relative to its clamping position. However, the outwardly pivoted laterally positioned securing member is always coupled with the centrally positioned securing member such that its displacement movement in both directions is reliably transferred to the laterally positioned securing member. Since due to the rocker arm the displacement movement of the centrally positioned securing member is transmitted, only a short stroke of the centrally positioned securing member is required in order to realize a great pivoting angle. The required constructive expenditure for this action is small; however, a secure and reliable operation is always provided.

Due to the control curves which control the pivoting movement of the rocker arm, it is further ensured that the laterally positioned securing members are without problems guided against the control surfaces provided at the center piece and that no false actuation, especially upon return of the laterally positioned securing members, can occur. Furthermore, with the inventively embodied control curves a securing member which is not pivoted into an enlarged insertion opening can be pivoted in any suitably selected position. With a high operational safety it is thus possible, especially since no components are subjected to great wear, to also provide a reliable operational function over an extended period of time.

DESCRIPTION OF PREFERRED EMBODIMENTS

The present invention will now be described in detail with the aid of several specific embodiments utilizing FIGS. 1 through 9.

The support 1, 1', 1" represented in FIGS. 1 to 9 serves for clamping and/or supporting a workpiece W on a turning lathe and is comprised in each embodiment of three securing members 3, 4 and 5 supported within the housing 2. The three securing members 3, 4, and 5 are adjustable in a common plane. The two laterally positioned securing members 4 and 5 are embodied as levers and are pivotably supported at the housing 2 with pivot bolts 9, 10. The centrally positioned securing member 3 is slidably guided in a radial direction toward the workpiece W. For this purpose, the centrally positioned securing member 3 is connected to an actuating piston 12 which is inserted into a cylinder 11 that is flanged to the housing 2 and which is adjustable by alternating the supply of a pressure medium into a pressure chamber 14 or a pressure chamber 15. Its piston rod 13 is in driving connection with the centrally positioned securing member 3. Furthermore, the centrally positioned securing member 3 comprises a center piece 6 that is provided with control surfaces 7, 8. The center piece 6 with its control surfaces 7 and 8 cooperates with the free ends of the two laterally positioned securing members 4 and 5 which for this purpose are provided with rollers 16 and 18 rotatably supported on bearing bolts 17 and 19.

The housing 2 is shown in an end view. A cover 2' is placed thereon and connected to the side wall 2" of the housing 2 with screws. In order to prevent that, for example, cuttings or other contaminations can be introduced into the interior of the housing 2, the outlet openings of the securing members 3, 4 and 5 are sealed by non-represented seals.

Figure 2:
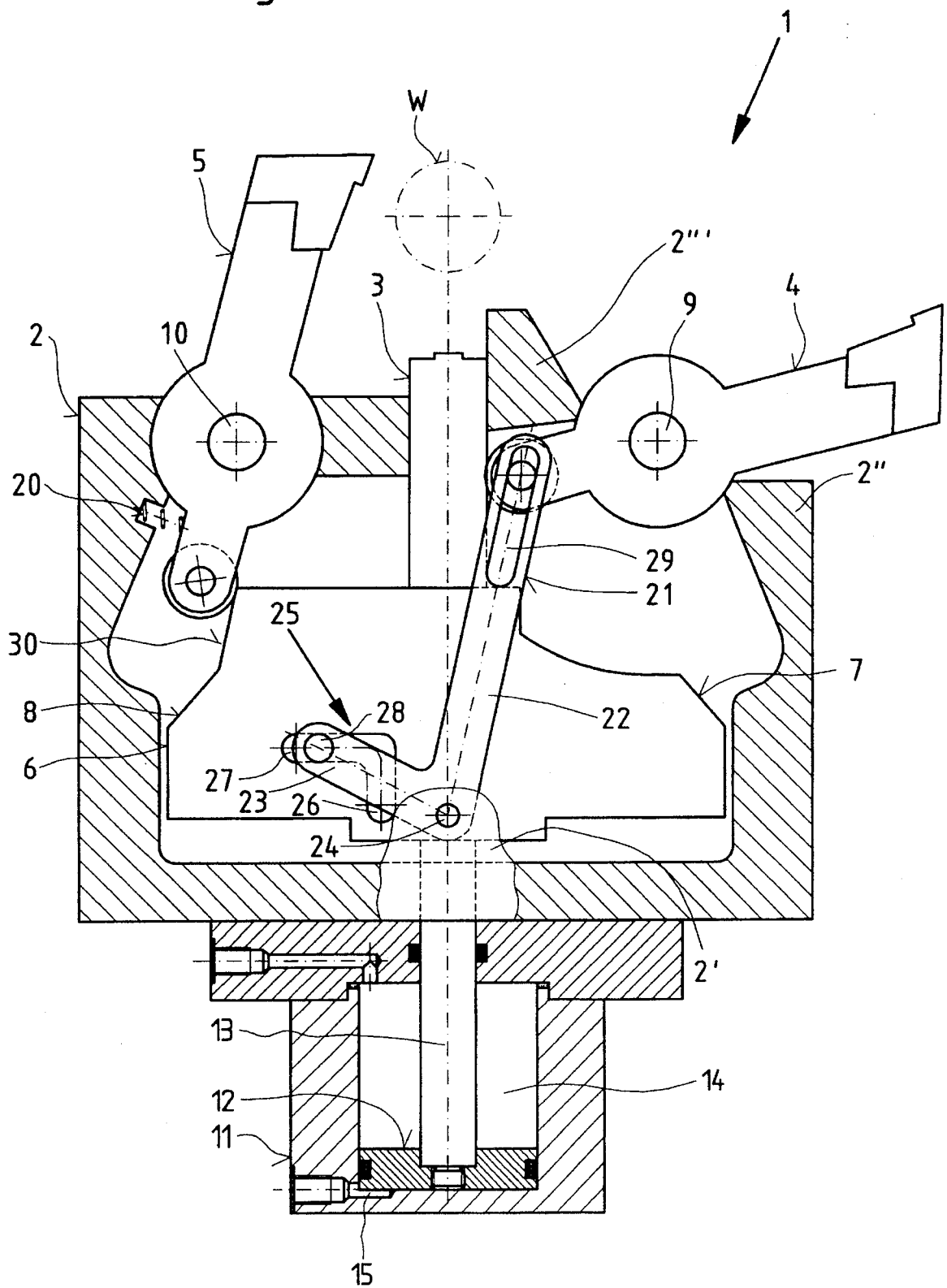
FIG. 2 shows the support of FIG. 1 with the laterally positioned securing member in its open position.

In order to enlarge the insertion opening of the support 1 and to pivot the laterally positioned securing member 4 by an additional displacement movement of the centrally positioned securing member 3 about an angle of approximately 110°, the laterally positioned securing member 4, as represented in FIG. 2, is pivotably connected with a rocker arm 21 to the center piece 6 connected to the centrally positioned securing member 3 for a forced pivoting movement. This is achieved such that the rocker arm 21 is in the form of a lever with two legs which at the junction of the two legs 22 and 23 is connected with a pivot bolt 24 at the cover 2' of the housing 2 in a pivotable manner. Furthermore, the leg 22 of the rocker arm 21 is connected to the laterally positioned securing member 4 and the leg 23 to the center piece 6.

The center piece 6 is provided with a control curve 25 which is comprised of a first curve portion 26 extending parallel to the centrally positioned securing member 3 and a second curve portion that extends perpendicular to the direction of displacement of the centrally positioned securing member 3. A guide element in the form of a pin 28 projecting from the leg 23 engages the control curve 25 so that the rocker arm 21 is coupled to the center piece 6. The leg 22 on the other hand is provided with a slotted hole 29 that is engaged by the laterally projecting bearing bolt 17 supporting the roller 16 that cooperates with the control surface 7. Accordingly, the rocker arm 21, during clamping action and upon contact of the rollers 16 and 18 at the control surfaces 7 and 8 is thus eliminated because the laterally projecting bearing bolt 17 can move within the slotted hole 29.

When instead the centrally positioned securing member 3 is displaced with the actuating piston 12 into the position shown in FIG. 2, the rocker arm 21 as soon as the pin 28 reaches the curve portion 27, is rotated about the pivot bolt 24. With this pivoting movement of the rocker arm 21 the laterally positioned securing member 4 is pivoted into the position shown in FIG. 2 so that a large insertion opening is provided.

In this operational position of the support 1 the roller 19 of the laterally positioned securing member 5 is in contact with an abutment surface 30 that is provided as an extension of the control surface 8 at the center piece 6 and this position is stabilized by a spring 20 acting on the securing member 5.

Figure 3:
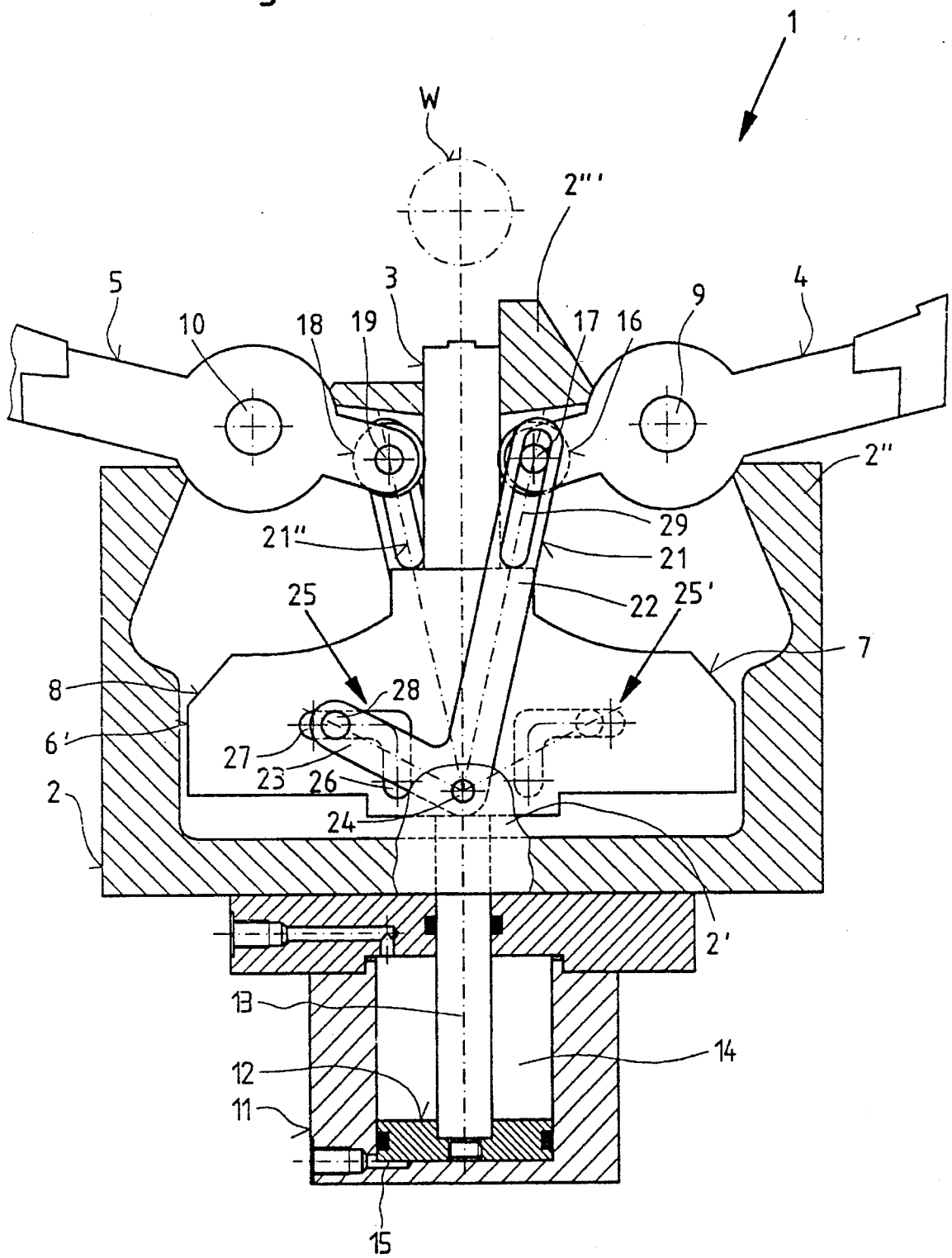
FIG. 3 shows the support of FIG. 1 with two pivotable securing members.

FIG. 3 shows that the two laterally positioned securing members 4 and 5 can be pivoted outwardly by the rocker arms 21 and 21". The rocker arm 21" for coupling the securing member 5 as well as the corresponding control curve provided at the center piece 6' are only shown in a dash-dotted line.

Figure 4:
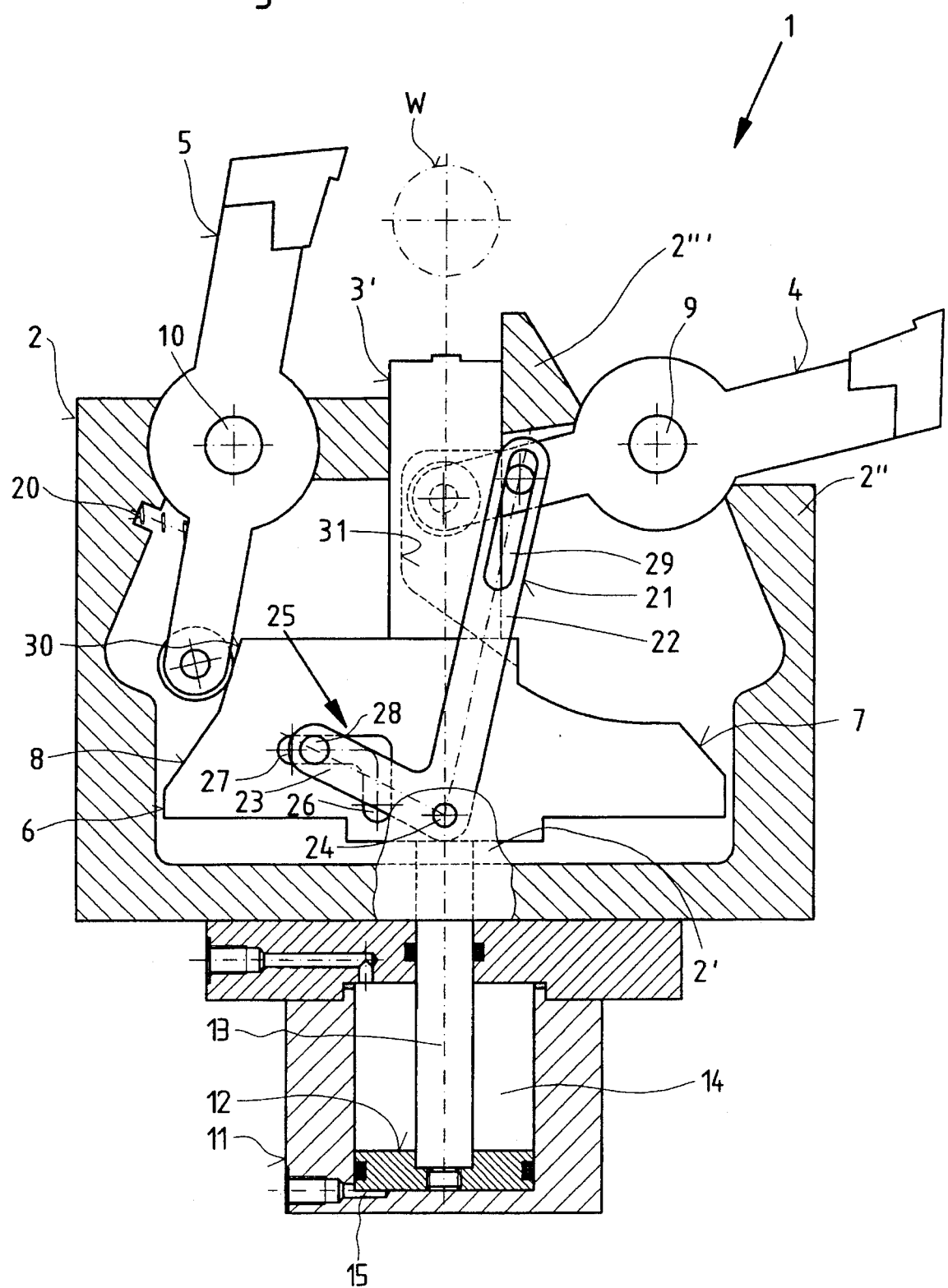
FIG. 4 shows the support of FIG. 1 in another embodiment in a representation according to FIG. 2.

According to FIG. 4 the centrally positioned securing member 3' is provided with a receiving recess 31 open in the direction of the securing member 4 into which the end of the securing member 4 facing the center piece 6 is introducible. With this measure, the constructive width of the support 1 is reduced. With a projection 2''', formed as an integral part of the housing 2 and extending in the direction toward the centrally positioned securing members 3 and 3', the recess 31 in the clamping position of the support 1 is covered.

Figure 5:
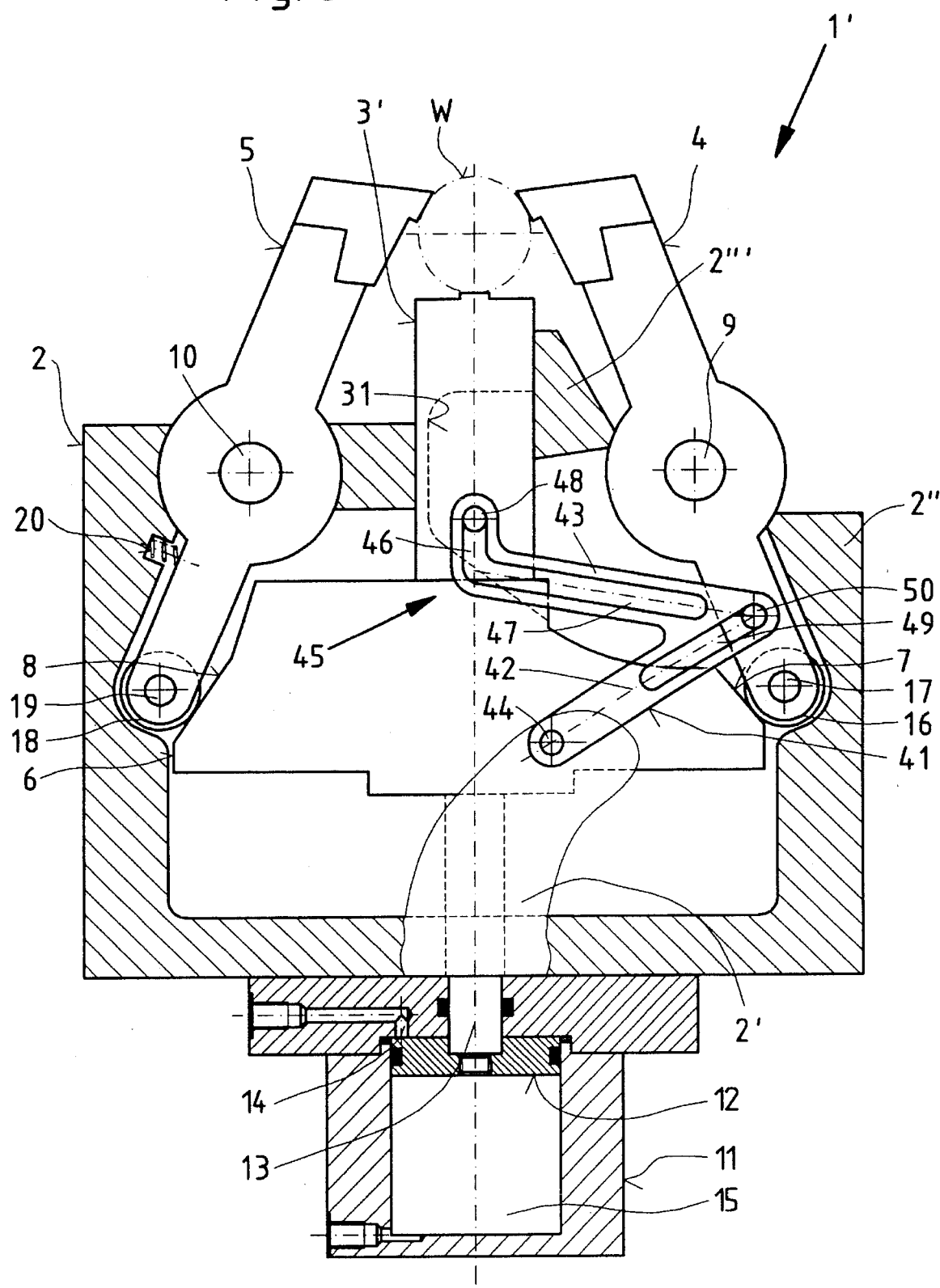
FIG. 5 shows the support according to FIG. 1 with a differently embodied rocker arm.
Figure 6:
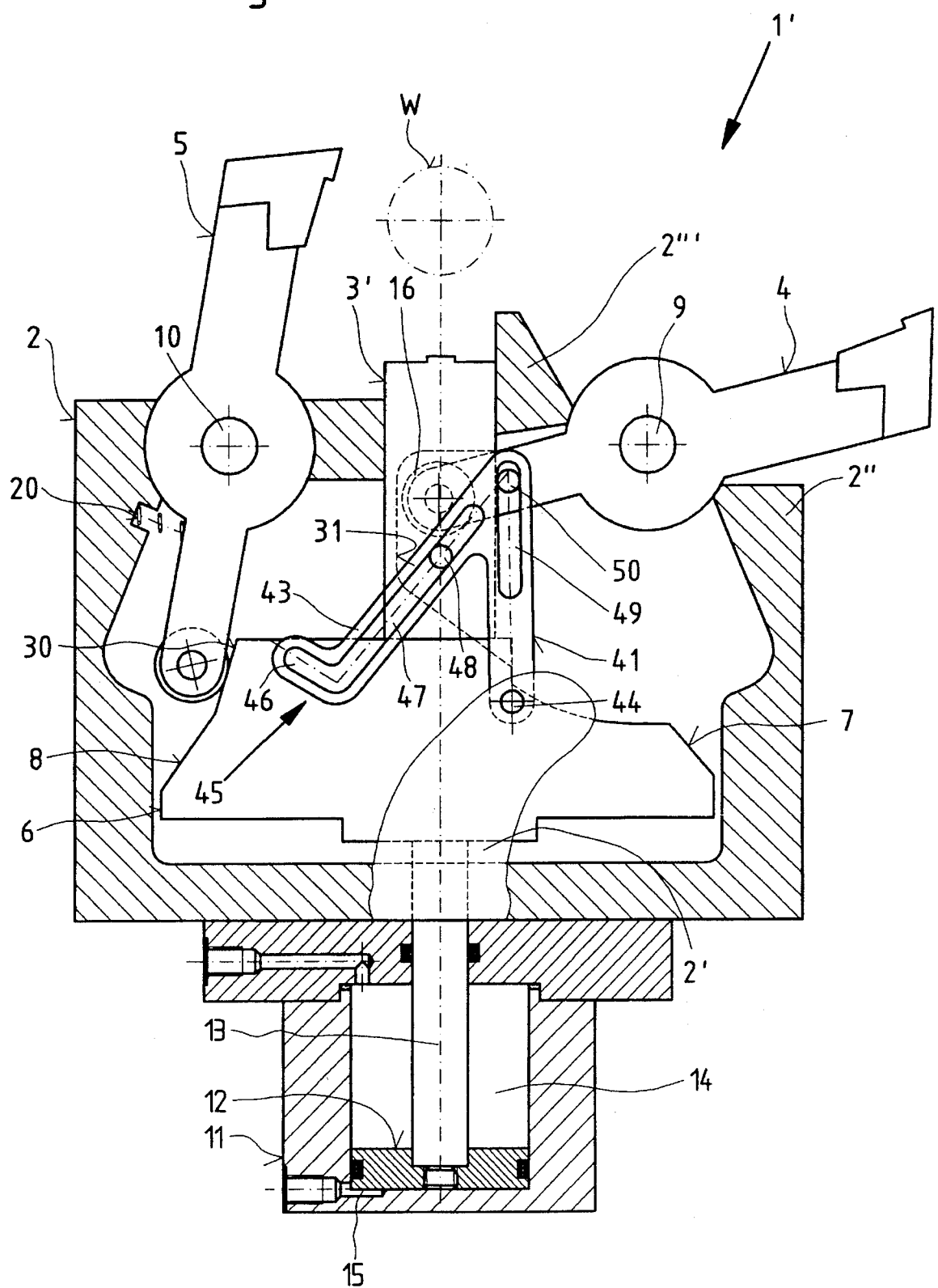
FIG. 6 shows the support of FIG. 5 with the laterally positioned securing member in its open position.

In the embodiment of the support 1' according to FIGS. 5 and 6 the laterally positioned securing member is coupled with a rocker arm 41 to the centrally positioned securing member 3'. The leg 42 of the rocker arm 41 is pivotably supported about a pivot bolt 44 inserted into the cover 2' of the housing 2.

At the junction of the two legs 42, 43 the rocker arm 41 is connected to the laterally positioned securing member 4, and, furthermore, the leg 43 is provided with a two-part control curve 44 that is engaged by a guide element in the form of a pin 48 connected to the centrally positioned securing member 3'.

The connection of the rocker arm 41 to the laterally positioned securing member 4 is achieved with a pin 50 which is guided in a slotted hole 49 provided at the leg 42. Furthermore, the control curve 45 provided at the leg 43 has a curve portion 46 which, as long as the securing members 3, 4, and 5 are positioned within the clamping range of the support, extends in the axial direction of the centrally positioned securing member 3 so that with this curve portion 46 during clamping actions the position of the rocker arm 41 is not changed. As soon as the centrally positioned securing member 3' is retracted past the maximum clamping range due to the actuating piston 12 and the pin 48 is introduced into the curve portion 47, connected to the curve portion 46 and extending towards the pin 50, the rocker arm 41 and the securing member 4 connected thereto are pivoted such that an enlarged insertion opening results, as shown in FIG. 6.

Figure 7:
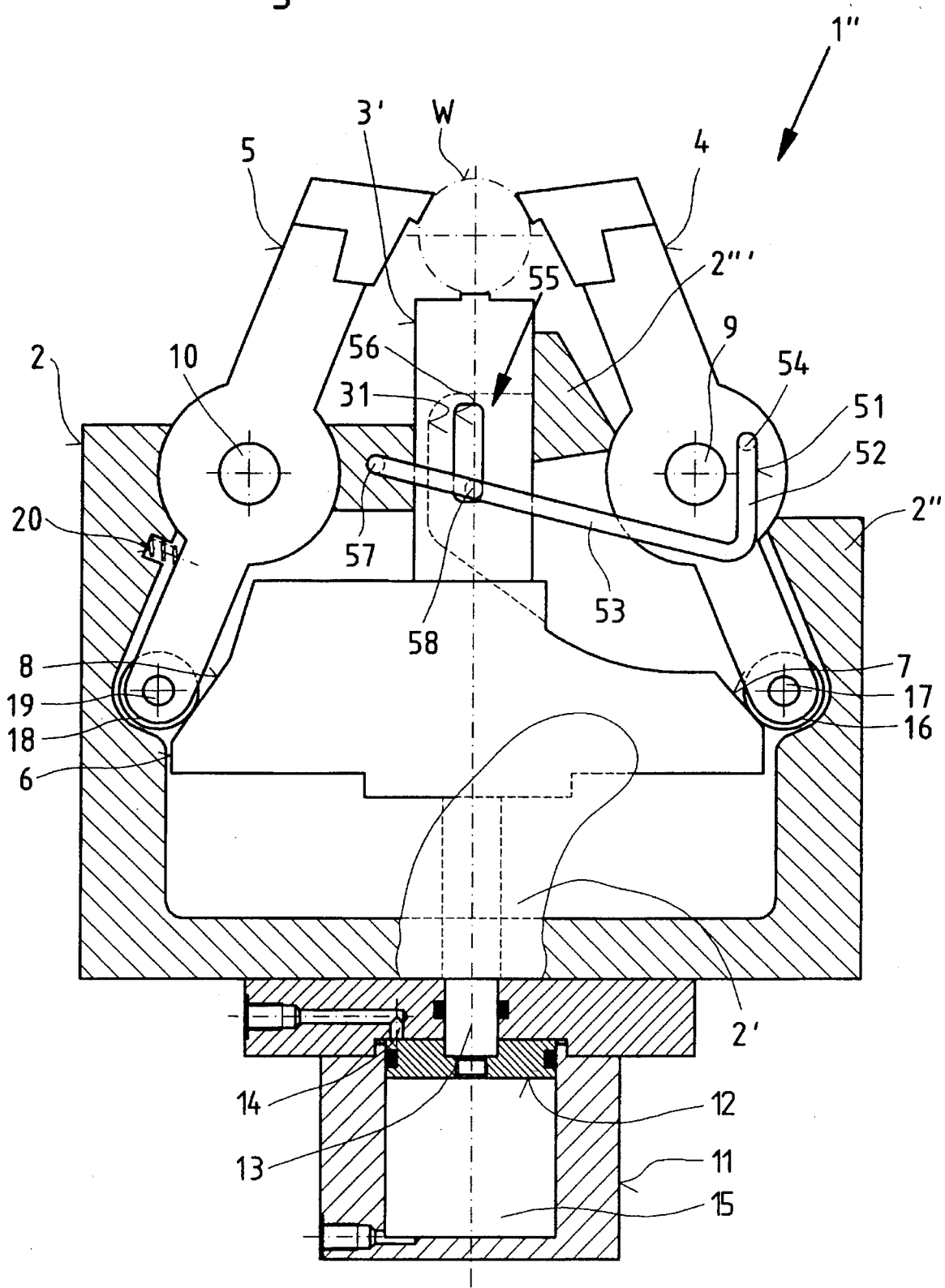
FIG. 7 shows the support according to FIG. 1 with a different coupling of the laterally positioned securing members.
Figure 8:
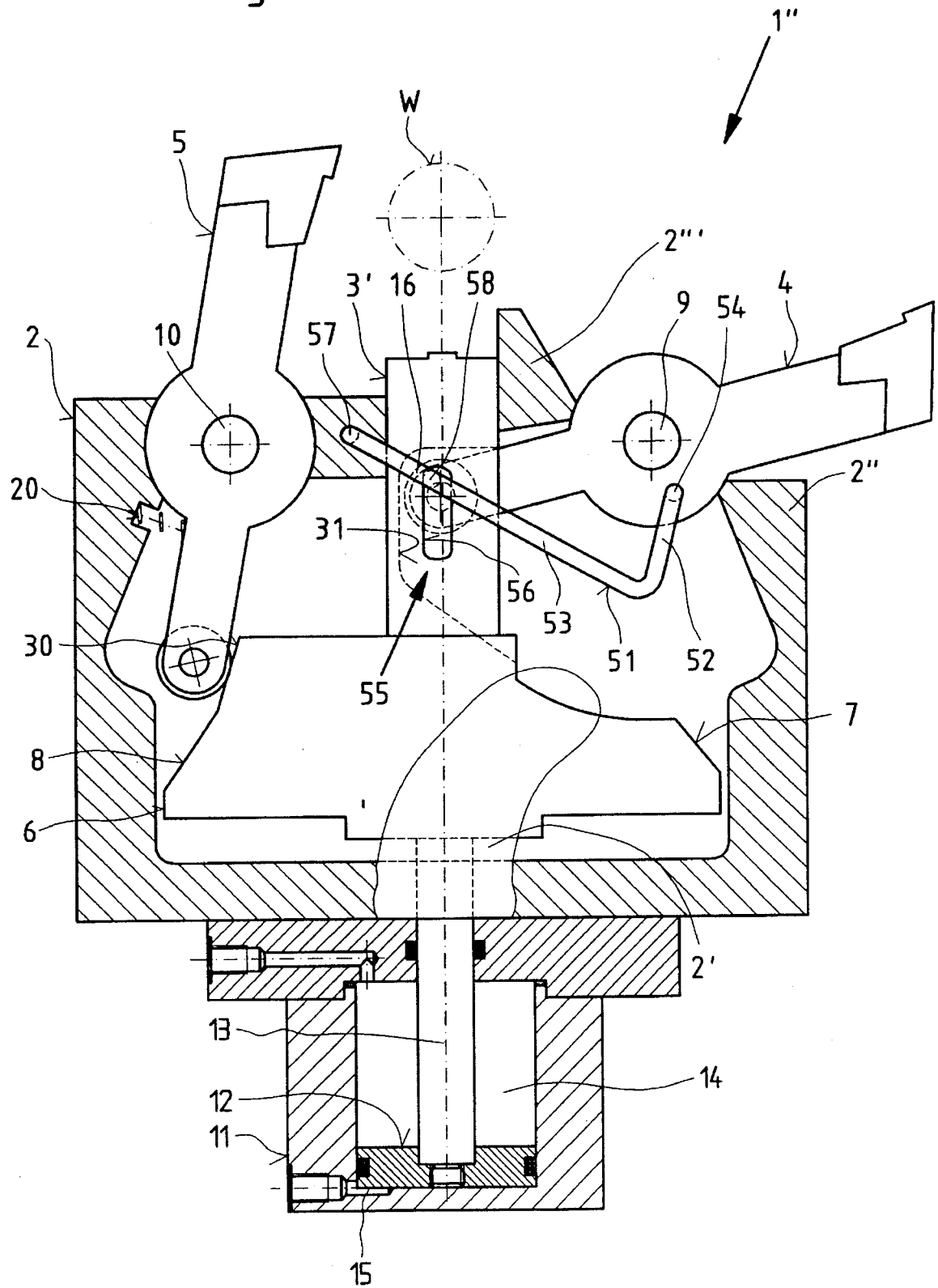
FIG. 8 shows the support of FIG. 7 with the laterally positioned securing member in its open position.

In the embodiment shown in FIGS. 7 and 8, a two-leg rocker arm 51 serves to pivot the laterally positioned securing member 4 of the support 1". In the end portion of its legs 52 and 53 the rocker arm 51 is connected with pivot bolts 54 and 57 to the laterally positioned securing member 4, respectively, to the housing 2 at approximately the same level. Furthermore, the leg 53 of the rocker arm 51 has a pin 58 as a guiding element which engages the control curve 55 in the form of a longitudinal groove 56 provided at the centrally positioned securing member 3'.

When the centrally positioned securing member 3 is displaced into the operating position shown in FIG. 8, the rocker arm 51 is rotated about the pivot bolt 57 by the pin 58 engaging the control curve 55 such that the laterally positioned securing member 4 is outwardly pivoted and the support 1" is thus provided with an enlarged insertion opening.

Figure 9:
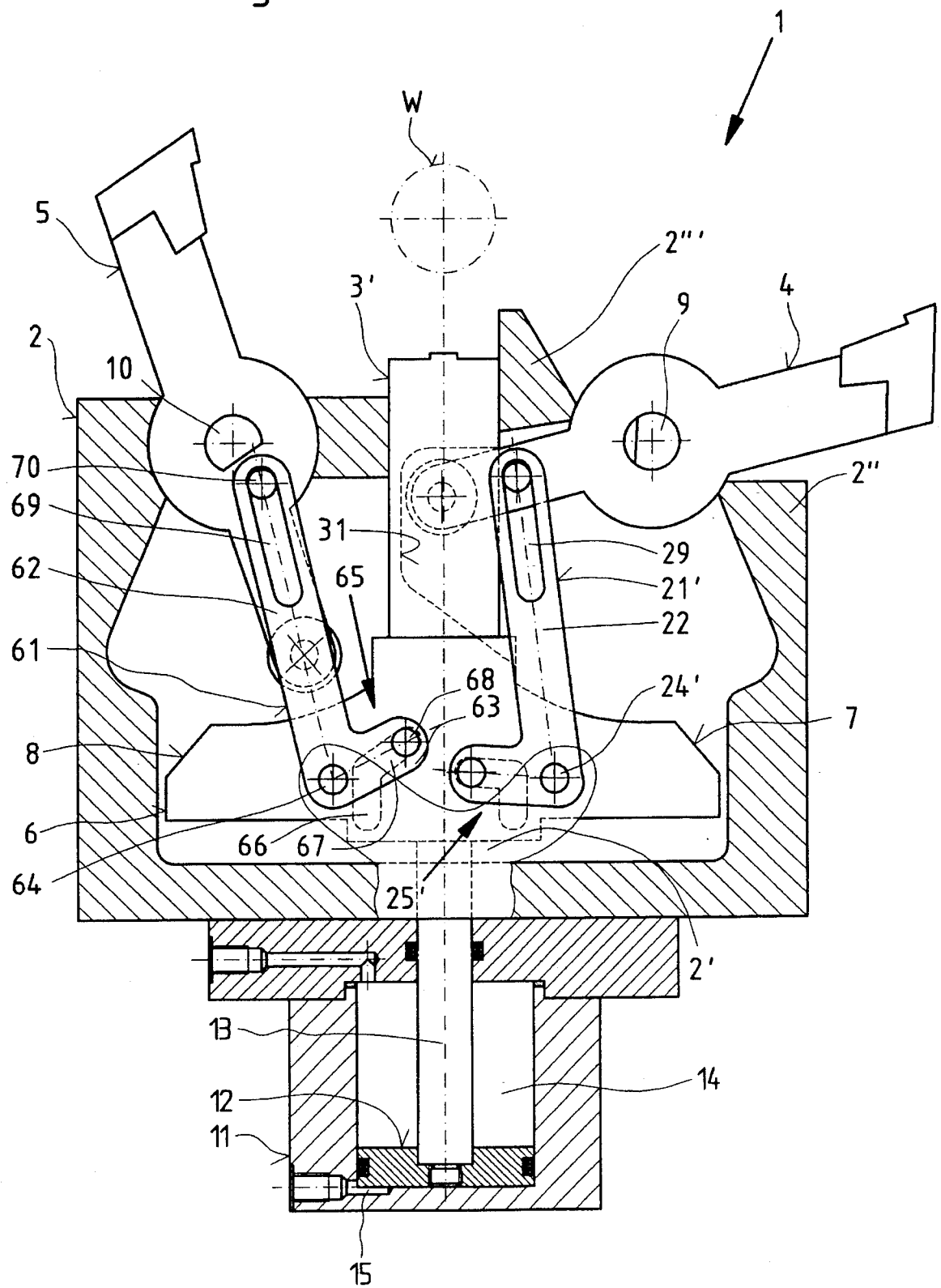
FIG. 9 shows the support according to FIG. 1 in which the laterally positioned securing members can be positioned into their operational position with differently connected rocker arms and differently designed control curves.

FIG. 9 shows that the laterally positioned securing member 4 of the support 1 is pivotable with a two-leg rocker arm 21' which, with the aid of the control curve 25', is pivotable about a pivot bolt 24'. The oppositely arranged securing member 5 is displacable into a selectable angular position with a further identically embodied, but differently connected rocker arm 61 during the additional displacement movement of the centrally positioned securing member 3'. The rocker arm 61, at the junction of the two legs 62 and 63, is pivotably supported with a pivot bolt 64 at the cover 2' of the housing 2 and the center piece 6 is provided with an angular two-part control curve 65 with which the rocker arm 61 and the support member 5 connected to leg 62 can be pivoted accordingly. The control curve 65 has a first curve portion 66 that extends parallel to the centrally positioned securing member 3' as well as a second curve portion 67 which is positioned at a slant to the first curve portion. A guiding element in the form of a pin 68 connected to the leg 63 of the rocker arm 61 engages the control curve 65. The leg 62 is provided with a slotted hole 69 that is engaged by a pin 70 which is connected to the securing member 5. As a function of the slant of the curve portion 67 of the control curve 65 a return of the centrally positioned securing member 3 with its fixedly attached center piece 6 results in a pivoting of the securing member 5 to a greater or lesser extent.

The present invention is, of course, in no way restricted to the specific disclosure of the specification and drawings, but also encompasses any modifications within the scope of the appended claims.

What I claim is:

1. A self-centering support for clamping and securing a workpiece on a turning lathe, said support comprising:

a housing;

three securing members connected in said housing and adjustable in a common plane for securing a workpiece, said three securing members each having a first end for securing the workpiece;

a first and a second one of said securing members positioned laterally in said housing and arranged mirror-symmetrically to one another;

said first and said second securing members each comprising a pivot bolt for pivotably connecting said first and said second securing members to said housing;

a third one of said securing members positioned between said first and said second securing members and slidably guided within said housing so as to be radially displaceable relative to a workpiece;

said third securing member comprising a center piece connected thereto, said center piece having control surfaces;

said first and said second securing members each having a second end opposite said first end for cooperating with said control surfaces of said center piece;

a first rocker arm for coupling said first securing member to said third securing member for displacement of said first securing member such that upon actuation of said first rocker arm an insertion opening for the workpiece between said three securing members is enlarged;

said first rocker arm being in the form of an angular lever with a first and a second leg, said first rocker arm being pivotably supported at at least one of said housing and said first securing member;

said center piece having a control curve in the form of a recess and said first rocker arm pivotable by a displacement of said third securing member according to said control curve;

wherein said control curve is located at said third securing member and wherein one of said first and second legs of said first rocker arm coordinated with said control curve has a guide element for engaging said control curve; and wherein said control curve is comprised of a first portion extending parallel to a direction of displacement of said third securing member and a second portion extending perpendicularly to said direction of displacement of said third securing member.

2. A support according to claim 1, wherein said first and said second securing members each have a roller connected to said second end for cooperating with said control surfaces.

3. A support according to claim 2, wherein one of said control surfaces cooperating with said second end of said second securing member has an abutment surface formed as an extension of said one control surface for guiding said second securing member with said roller.

4. A support according to claim 2, wherein;

said first leg of said first rocker arm has a free end with a slotted hole;

said first securing member has a bearing bolt for supporting said roller at said second end; and said bearing bolt engages said slotted hole for connecting said first leg of said first rocker arm to said first securing member.

5. A support according to claim 1, wherein said first rocker arm has a pivot bolt positioned at a junction of said first and said second legs, said pivot bolt connected to said housing.

6. A support according to claim 5, wherein said housing comprises a cover and wherein said pivot bolt of said first rocker arm is connected to said cover.

7. A support according to claim 5, wherein said pivot bolt of said first rocker arm is connected centrally relative to said third securing member.

8. A support according to claim 1, wherein said guide element is a pin.

9. A support according to claim 1, wherein said control curve is located at said center piece.

10. A support according to claim 1, wherein:

said first leg of said first rocker arm is connected at a first connecting point to said first securing member;

said second leg of said first rocker arm is pivotably connected at a second connecting point to said housing;

said first and said second connecting points are substantially at a same level of said housing; and said second leg is coordinated with said third securing member and coupled to said control curve.

11. A support according to claim 10, wherein said first connecting point is centrally positioned between said pivot bolt of said first securing member and a sidewall of said housing proximal to said first securing member.

12. A support according to claim 1, wherein said third securing member has a receiving recess on a first side thereof for receiving said second end of said first securing member upon actuation by said first rocker arm.

13. A support according to claim 12, further comprising a second rocker arm, identical to said first rocker arm and connected to said second securing member, wherein said third securing member has a second receiving recess arranged on a second side opposite said first side for receiving said second end of said second securing member upon actuation by said second rocker arm.

14. A support according to claim 1, further comprising a second rocker arm for connecting said second securing member to said third securing member, said second rocker arm having a first and a second leg and pivotably connected to said third securing member with a junction of said first and said second legs, wherein said first leg is pivotably connected to said second securing member and wherein said third securing member has a second control curve with which second control curve said second leg is displaceable.

15. A support according to claim 14, wherein said second control curve is located at said center piece.

16. A support according to claim 14, wherein said second rocker arm is connected to said center piece.

* * * * *